US008531108B2

(12) United States Patent

Tominaga et al.

(10) Patent No.: US 8,531,108 B2

(45) Date of Patent: Sep. 10, 2013

(54) HEADLAMP FOR VEHICLE

(75) Inventors: Motonori Tominaga, Anjo (JP); Tsutomu Kamizono, Nagoya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 221 days.

(21) Appl. No.: 13/199,890

(22) Filed: Sep. 12, 2011

(65) Prior Publication Data

US 2012/0062117 A1 Mar. 15, 2012

(30) Foreign Application Priority Data

Sep. 13, 2010 (JP) ................................ 2010-204591

(51) Int. Cl.

*B60Q 1/02* (2006.01)
*H01J 1/62* (2006.01)
*F21V 29/00* (2006.01)

(52) U.S. Cl.

USPC .............................. 315/82; 313/512; 362/294

(58) Field of Classification Search

USPC ..................... 315/77–84; 362/267, 294, 373, 362/523, 545, 547; 313/495, 499, 500–505, 313/512

See application file for complete search history.

(56) References Cited

U.S. PATENT DOCUMENTS

| | | | | |
|---|---|---|---|---|
| 6,639,360 | B2 * | 10/2003 | Roberts et al. | 313/512 |
| 2003/0058656 | A1 | 3/2003 | Yamaguchi | |
| 2004/0202007 | A1 | 10/2004 | Yagi et al. | |
| 2008/0055534 | A1 | 3/2008 | Kawano | |

FOREIGN PATENT DOCUMENTS

| | | |
|---|---|---|
| JP | 2003-068134 | 3/2003 |
| JP | 2004-311224 | 11/2004 |
| JP | 2008-060204 | 3/2008 |

* cited by examiner

*Primary Examiner* — Jimmy Vu

(74) *Attorney, Agent, or Firm* — Harness, Dickey & Pierce, PLC

(57) ABSTRACT

A headlamp for a vehicle includes: a housing having a front opening; a lens cover arranged to cover the front opening of the housing; a lamp chamber defined by the housing and the lens cover; a light source provided in the lamp chamber; a lighting control circuit that controls lighting of the light source; and a heat dissipating member arranged in the lamp chamber. Further, the lighting control circuit is formed on a substrate. The heat dissipating member has a pillar portion and a plurality of heat dissipating fins. The pillar portion has the light source mounted thereto. The heat dissipating fins are provided on an outer periphery of the pillar portion so as to be spaced from one another. The pillar portion also has a recess formed therein. The substrate is received in the recess of the pillar portion.

11 Claims, 8 Drawing Sheets

HEADLAMP FOR VEHICLE

CROSS-REFERENCE TO RELATED APPLICATION

This application is based on and claims priority from Japanese Patent Application No. 2010-204591, filed on Sep. 13, 2010, the content of which is hereby incorporated by reference in its entirety into this application.

BACKGROUND OF THE INVENTION

1. Technical Field of the Invention

The present invention relates generally to headlamps for vehicles which include a heat dissipating member for dissipating heat generated by a light source. More particularly, the invention relates to headlamp's for vehicles which employ a light source that has high heat-generating density and is lowered in luminous efficiency and shortened in service life at high temperature.

2. Description of the Related Art

Japanese Patent Application Publication No. 2004-311224 discloses a headlamp for a vehicle which employs LEDs (Light Emitting Diodes) as lighting sources. The headlamp includes a plurality of light emitting units each of which has a projection lens, a reflector and an LED that are sequentially arranged from the front side. The headlamp further includes a heat dissipating member (or support member) that has all of the LEDs of the light emitting units mounted thereon, so as to dissipate heat generated by the LEDs during operation. In addition, the headlamp also includes a housing in which all of the light emitting units are accommodated.

With the above headlamp, however, it may be necessary to arrange a lighting control circuit, which controls the lighting of the LEDs, outside the housing and thus away from the LEDs. Consequently, the electric resistance between the LEDs and the lighting control circuit will be high. Moreover, when a temperature sensing element is arranged in the vicinity of the LEDs for sensing the temperature of the LEDs, it is necessary to electrically connect the temperature sensing element to the lighting control circuit using signal lines that extend through the housing. Consequently, the wiring process of the headlamp will be complicated. Furthermore, to effectively dissipate heat generated by the lighting control circuit, it may be necessary to arrange an additional heat dissipating member for the lighting control circuit outside the housing, thereby increasing both the parts count and size of the headlamp.

Japanese Patent Application Publication No. 2003-68134 discloses a headlamp which includes a discharge bulb as a light source, a lighting control circuit for controlling the lighting of the discharge bulb, a heat dissipating member for dissipating heat generated by the lighting control circuit, and a housing that accommodates therein all of the discharge bulb, the lighting control circuit and the heat dissipating member.

With the above headlamp, it is possible to arrange the lighting control circuit in the vicinity of the discharge bulb. However, to effectively dissipate heat generated by the discharge bulb, it may be necessary to arrange an additional heat dissipating member for the discharge bulb. Consequently, when not properly designed, both the parts count and size of the headlamp will be increased.

SUMMARY OF THE INVENTION

According to the present invention, there is provided a headlamp for a vehicle. The headlamp includes: a housing having a front opening; a lens cover arranged to cover the front opening of the housing; a lamp chamber defined by the housing and the lens cover; a light source provided in the lamp chamber; a lighting control circuit configured to control lighting of the light source; and a heat dissipating member arranged in the lamp chamber to dissipate heat generated by the light source. Further, in the headlamp, the lighting control circuit is formed on a substrate. The heat dissipating member has a pillar portion and a plurality of heat dissipating fins. The pillar portion has the light source mounted thereto. The heat dissipating fins are provided on an outer periphery of the pillar portion so as to be spaced from one another. The pillar portion also has a recess formed therein. The substrate is received in the recess of the pillar portion.

With the above configuration, both the heat generated by the light source and the heat generated by the lighting control circuit will be first transferred to the pillar portion and then dissipated via the heat dissipating fins. That is to say, it is possible to effectively dissipate both the heat generated by the light source and the heat generated by the lighting control circuit via the single heat dissipating member. Consequently, it becomes possible to minimize both the parts count and size of the headlamp while ensuring effective dissipation of both the heat generated by the light source and the heat generated by the lighting control circuit. In addition, since both the light source and the lighting control circuit are arranged within the lamp chamber, the wiring process of the headlamp can be simplified.

Preferably, the recess is formed to extend along the longitudinal direction of the pillar portion; the substrate is received in the recess with the longitudinal direction of the substrate coinciding with that of the pillar portion.

The lighting control circuit may include a plurality of high-heat-generating elements and a plurality of low-heat-generating elements that generate less heat than the high-heat-generating elements. In this case, the distances from the high-heat-generating elements to an interior surface of the pillar portion which defines the recess are preferably set to be less than a predetermined value. Further, the high-heat-generating elements are preferably located closer to a longitudinal axis of the pillar portion than the low-heat-generating elements are.

The recess of the pillar portion is preferably so formed that the shape of the recess conforms to that of the substrate on which the lighting control circuit is formed.

The light source may be mounted on an upper end face of the pillar portion of the heat dissipating member.

Alternatively, the heat dissipating member may further have a heat dissipating plate mounted on the upper end face of the pillar portion. The light source may be mounted to the heat dissipating plate.

Still alternatively, the light source may be mounted on a front part of a side surface of the pillar portion.

The recess may be formed in the side surface of the pillar portion to have an opening that opens on the side surface. In this case, the heat dissipating fins are preferably arranged on the side surface of the pillar portion except for the opening of the recess so as to each extend radially from the side surface.

Preferably, the pillar portion further has an injection hole formed therein, through which a filling material is injected in the recess.

It is preferable that the substrate has a temperature sensing element mounted thereon.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Figure 1:
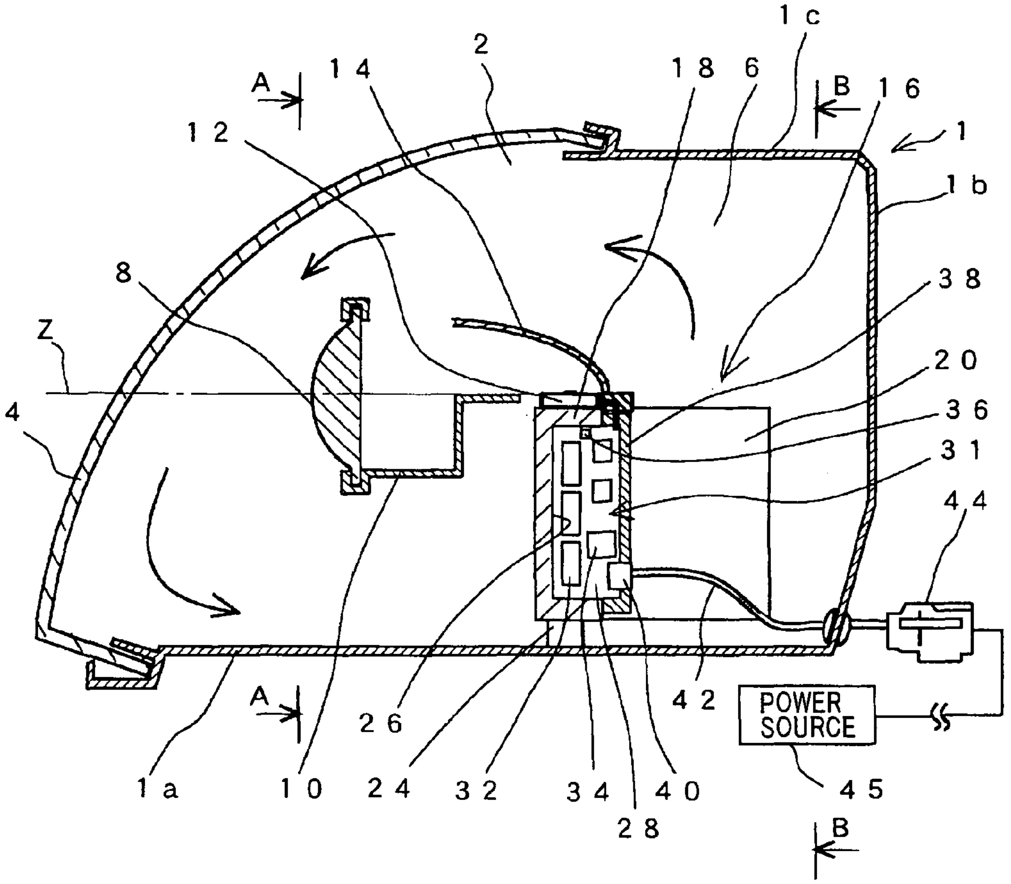
FIG. 1 is a schematic vertical cross-sectional view of a headlamp for a vehicle according to a first embodiment of the invention.
Figure 2:
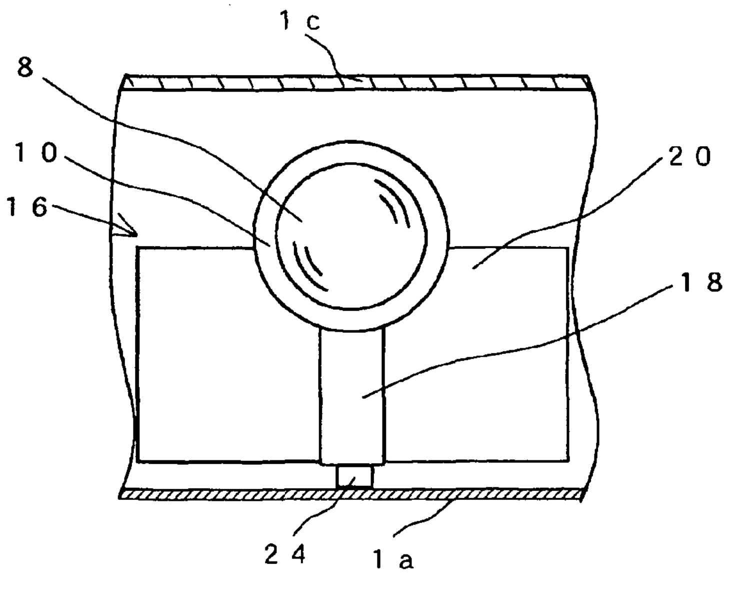
FIG. 2 is a cross-sectional view taken along the line A-A in FIG. 1.
Figure 3:
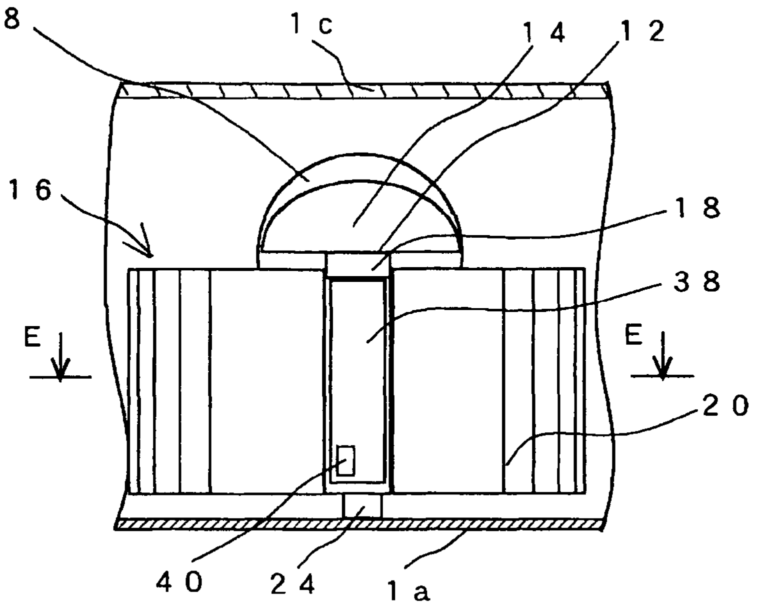
FIG. 3 is a cross-sectional view taken along the line B-B in FIG. 1.

FIG. 1 shows the overall configuration of a headlamp according to the first embodiment of the invention.

The headlamp includes a housing 1 that has a front opening 2 and is closed by a lower wall 1*a*, a rear wall 1*b* and an upper wall 1*c* except for the front opening 2. Further, a lens cover 4 is arranged to cover the front opening 2, thereby completely closing the housing 1. Consequently, a lamp chamber 6 is defined by the housing 1 and the lens cover 4.

Within the lamp chamber 6, a projection lens 8, a shade 10 and a light source 12 are sequentially arranged along an optical axis Z of the headlamp from the front side to the rear side. Further, a reflector 14 is also arranged in the lamp chamber 6 so as to face the light source 12. The reflector 14 is provided to reflect light emitted by the light source 12.

In the present embodiment, the projection lens 8 is implemented by a plano-convex lens. The reflector 14 has an inside reflecting surface that is curved into, for example, a paraboloid of revolution. The projection lens 8 and the reflector 14 are positioned with respect to each other so that the focal point of the projection lens 8 is at substantially the same position as that of the reflector 14. Part of the light emitted by the light source 12 and reflected by the reflector 14 is blocked by the shade 10; the remaining part of the light is projected forward by the projection lens 8. In addition, in the present embodiment, the shade 10 also functions as a supporting member to support the projection lens 8.

It should be noted that though the headlamp according to the present embodiment is a projector-type headlamp which includes the projection lens 8 and the reflector 14, the invention may also be applied to reflector-type and direct projection-type headlamps.

Moreover, in the present embodiment, the light source 12 is implemented by an LED (Light Emitting Diode). Further, the light source 12 is disposed on a heat dissipating member 16 that is also received in the lamp chamber 6.

More specifically, in the present embodiment, as shown in FIGS. 1-4, the heat dissipating member 16 is configured to include a pillar portion 18 and a plurality of heat dissipating fins 20. The pillar portion 18 has a cylindrical shape and is mounted on a supporting member 24 so as to extend in the vertical direction; the supporting member 24 is mounted on the lower wall 1*a* of the housing 1. The light source 12 is mounted on an upper end face Of the pillar portion 18.

Figure 5:
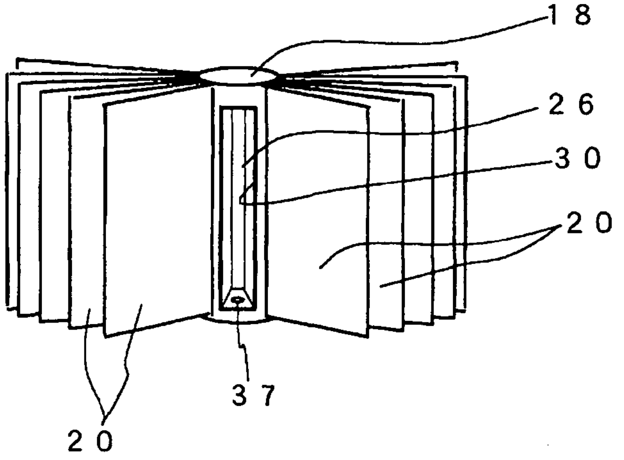
FIG. 5 is a perspective view of a heat dissipating member of the headlamp from the rear side.
Figure 6:
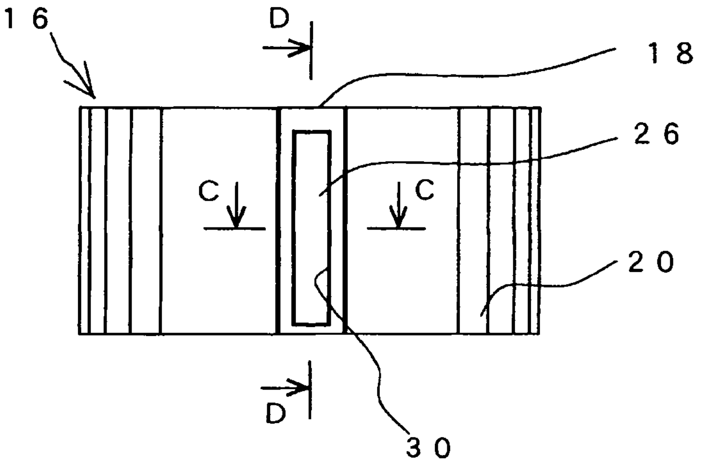
FIG. 6 is a rear end view of the heat dissipating member.
Figure 7:
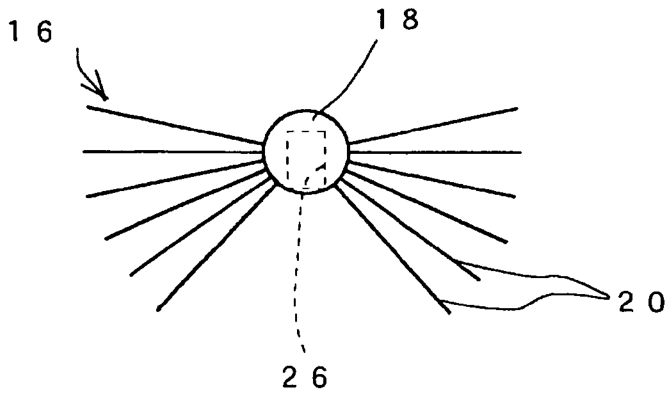
FIG. 7 is a top view of the heat dissipating member.

The heat dissipating fins 20 are plate-shaped and provided on the radially outer periphery of the pillar portion 18. More specifically, as shown in FIGS. 5-7, the heat dissipating fins 20 each extend from the radially outer periphery of the pillar portion 18 with the longitudinal direction thereof coinciding with the vertical direction (or the axial direction of the pillar portion 18). The heat dissipating fins 20 are spaced in the circumferential direction of the pillar portion 18 at predetermined intervals so as to allow air to flow between each adjacent pair of the heat dissipating fins 20. In the present embodiment, the length of the heat dissipating fins 20 in the vertical direction is set to be equal to that of the pillar portion 18. In other words, the heat dissipating fins 20 extend over the entire axial length of the pillar portion 18. Moreover, between the lower ends of the heat dissipating fins 20 and the lower wall 1*a* of the housing 1, there is formed such a sufficient gap as to allow air to flow through the gap; the length of the gap in the vertical direction is equal to that of the supporting member 24.

It should be noted that though the length of the heat dissipating fins 20 is set to be equal to that of the pillar portion 18 in the present embodiment, the length of the heat dissipating fins 20 may also be set to other values as needed. It also should be noted that though the pillar portion 18 has the cylindrical shape in the present embodiment, it may also have other shapes, for example a square or hexagonal prismatic shape. In addition, when the pillar portion 18 is configured to have a prismatic shape, the heat dissipating fins 20 may be provided on the flat side surfaces of the pillar portion 18 so as to vertically extend parallel with one another.

The heat dissipating fins 20 may be made of a material having high heat conductivity, such as aluminum. In the present embodiment, the heat dissipating fins 20 are integrally formed with the pillar portion 18 by aluminum casting. However, it should be noted that the heat dissipating fins 20 may also be separately formed from the pillar portion 18 using an aluminum plate and then joined to the pillar portion 18 by, for example, brazing.

The pillar portion 18 has a recess 26 that is formed in the side surface of the pillar portion 18 so as to extend in the vertical direction (or the axial direction of the pillar portion 18). The recess 26 has an opening 30 that opens on the side surface of the pillar portion 18 and faces backward. Within the recess 26, there is received a substrate 28 on which a lighting control circuit 31 for controlling the lighting of the light source 12 is formed.

The lighting control circuit 31 is composed of various elements mounted on the substrate 28; those elements include high-heat-generating elements 32 and low-heat-generating elements 34 that generate less heat than the high-heat-generating elements 32 during operation. On the substrate 28, there is also mounted a temperature sensing element 36.

The temperature sensing element 36 is located on the substrate 28 so that when the substrate 28 is received in the recess 26 of the pillar portion 18, the temperature sensing element 36 is in the vicinity of the light source 12. More specifically, in the present embodiment, as shown in FIG. 1, the temperature sensing element 36 is positioned closest to the light source 12 among all the elements mounted on the substrate 28.

It should be noted that the substrate 28 is not necessarily completely received in the recess 26 of the pillar portion 18. In other words, the substrate 28 may also be partially received in the recess 26. However, even in this case, it is preferable that at least the high-heat-generating elements 32 are received in the recess 26.

Figure 10:
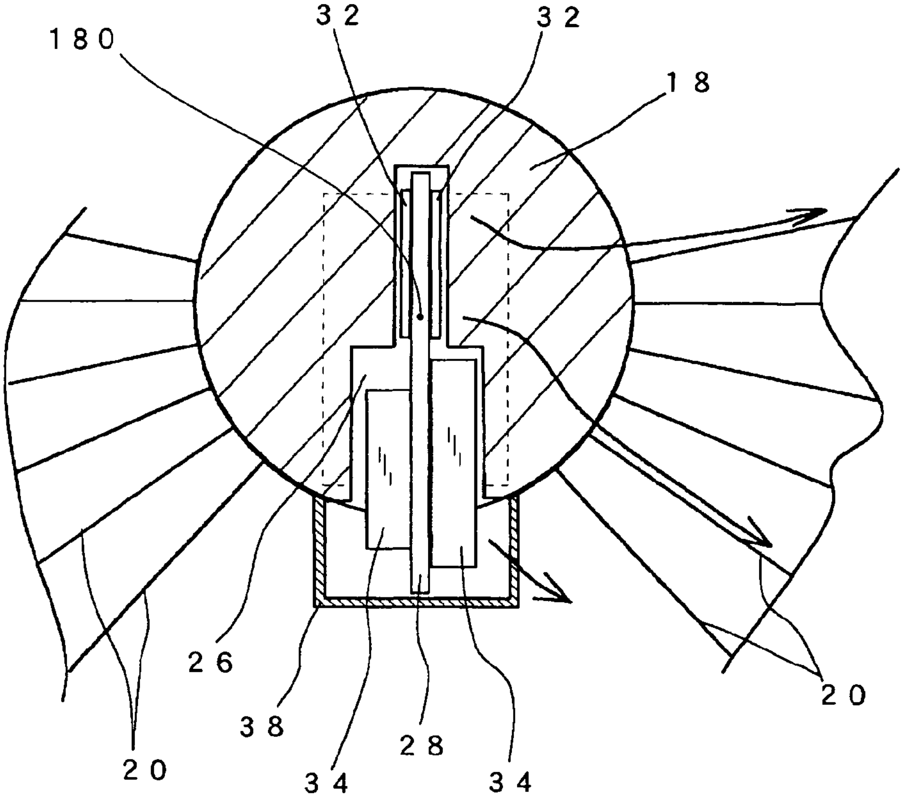
FIG. 10 is an enlarged cross-sectional view taken along the line E-E in FIG. 3.

Moreover, when the substrate 28 is received in the recess 26 of the pillar portion 18, the high-heat-generating elements 32 are located closer to the longitudinal axis 180 of the pillar portion 18 than the low-heat-generating elements 34 are (see FIG. 10).

Figure 4:
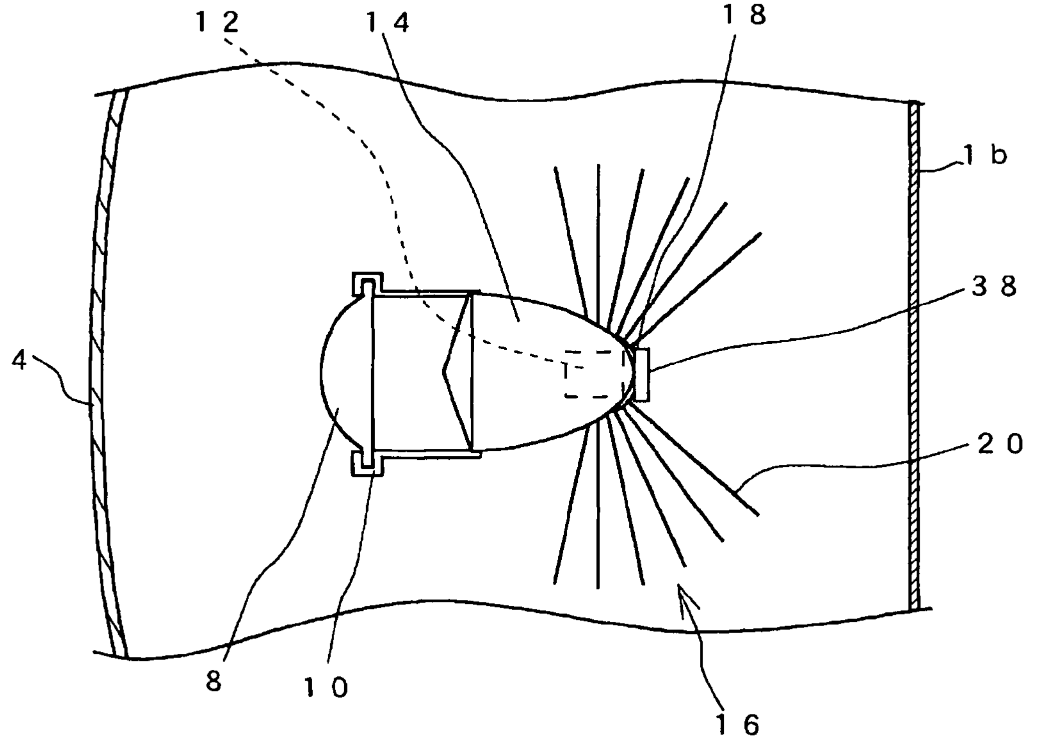
FIG. 4 is a schematic horizontal cross-sectional view of the headlamp.

In the present embodiment, as shown in FIGS. 4 and 7, the heat dissipating fins 20 are left-right symmetrically arranged on the side surface of the pillar portion 18 without interfering with the opening 30 of the recess 26 and the shade 10. Moreover, each of the heat dissipating fins 20 radially extends from the side surface of the pillar portion 18.

The recess 26 of the pillar portion 18 is formed so that when the substrate 28 is received in the recess 26, the distances between the heat-generating elements 32 and 34 of the lighting control circuit 31 and the interior surface of the pillar portion 18 which defines the recess 26, especially the distances between the high-heat-generating elements 32 and the interior surface are sufficiently small.

Figure 8A:
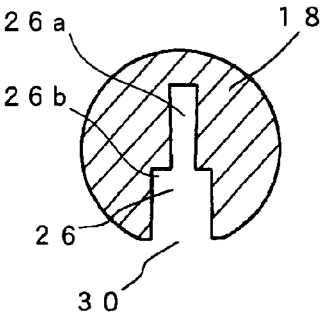
FIGS. 8A-8E are cross-sectional views taken along the line C-C in FIG. 6.

For example, referring to FIG. 8A, when the height of the high-heat-generating elements 32 is less than that of the low-heat-generating elements 34, the recess 26 may be stepped on both the left and right sides to have a small-width portion 26*a* and a large-width portion 26*b*; the small-width portion 26*a* has a smaller width than the large-width portion 26*b* in the left-right direction and is positioned forward of the large-width portion 26*b*. Consequently, the distances between the interior surface of the pillar portion 18 and the high-heat-generating elements 32, which are received in the small-width portion 26*a* of the recess 26, can be reduced.

Figure 8B:
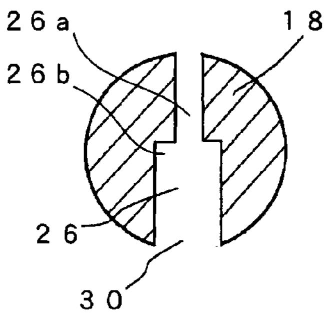

Further, as shown in FIG. 8B, the recess 26 may also be formed to penetrate the pillar portion 18 in the front-rear direction so that the small-width portion 26*a* has an opening on a front part of the side surface of the pillar portion 18.

Figure 8C:
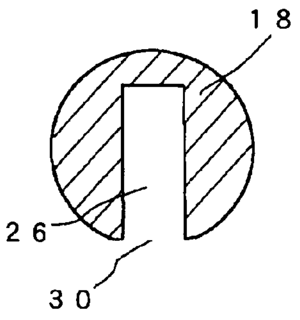

On the other hand, referring to FIG. 8C, when the height of the high-heat-generating elements 32 is equal to that of the low-heat-generating elements 34, the recess 26 may be formed to have only a single width in the left-right direction. In this case, the recess 26 has a rectangular cross section perpendicular to the axial direction of the pillar portion 18.

Figure 8D:
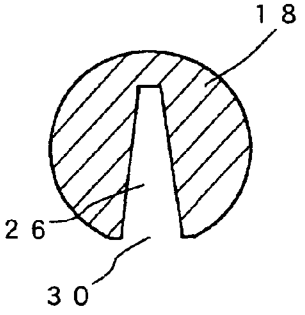

Furthermore, referring to FIG. 8D, when the heights of the heat-generating elements 32 and 34 gradually decrease from the front side to the rear side, the recess 26 may be formed so as to taper forward.

Figure 8E:
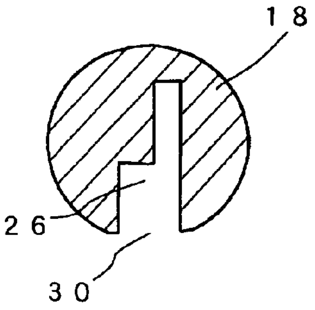

Referring to FIG. 8E, when all the elements are mounted on the same side of the substrate 28 and the high-heat-generating elements 32 have a smaller height than and is positioned forward of the low-heat-generating elements 34, the recess 26 may be stepped on only one of the left and right sides.

As described above, it is preferable to design the horizontal cross-sectional shape of the recess 26 according to the shapes of the elements 32, 34 and 36 mounted on the substrate 28, thereby minimizing the distances between the high-heat-generating elements 32 and the interior surface of the pillar portion 18 which defines the recess 26.

Further, in either of the above-described cases, it is preferable that the distances between the interior surface of the pillar portion 18 and the high-heat-generating elements 32 are in the range of 0.5 to 1.0 mm.

Moreover, it is also preferable to design the vertical cross-sectional shape of the recess 26 according to the shapes of the elements 32, 34 and 36, thereby further effectively minimizing the distances between the high-heat-generating elements 32 and the interior surface of the pillar portion 18 which defines the recess 26.

Figure 9:
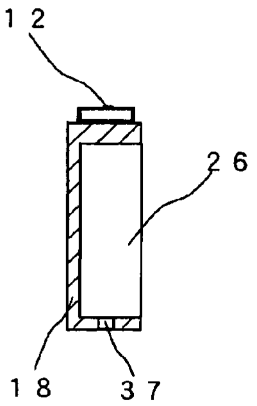
FIG. 9 is a cross-sectional view taken along the line D-D in FIG. 6.

Referring now to FIG. 9, in the present embodiment, the pillar portion 18 further has an injection hole 37 that is formed in the lower end face of the pillar portion 18 so as to communicate with the recess 26. Through the injection hole 37, a filling material, such as a heat-conductive gel, is injected in the recess 26, thereby filling the void space in the recess 26.

It should be noted that the filling material may be injected to fill the void space in the recess 26 either completely or partially. However, even in the latter case, it is preferable that at least the gaps between the high-heat-generating elements 32 and the interior surface of the pillar portion 18 which defines the recess 26 are filled with the filling material.

Moreover, in the present embodiment, as shown in FIG. 10, a cap 38 is mounted to the pillar portion 18 so as to close the opening 30 of the recess 26. With the cap 38, it is possible to prevent foreign matter, such as water and dust, from intruding into the recess 26. In addition, with the cap 38, during the injection of the filling material into the recess 26 via the injection hole 37, it is possible to prevent the filling material from leaking out of the recess 26 via the opening 30.

Furthermore, as shown in FIG. 1, a lead wire 42, which has one end connected to a connector 40 provided on the substrate 28, is extended through the cap 38 and the rear wall 1*b* of the housing 1, so as to have the other end located outside the housing 1. The other end of the lead wire 42 is then electrically connected to a power source 45 via a connector 45 provided on the outside of the housing 1.

After having described the configuration of the headlamp according to the present embodiment, operation thereof will be described hereinafter.

The light source 12 emits light upon being lighted up by the lighting control circuit 31. The light emitted by the light source 12 is then reflected by the reflector 14. Part of the light reflected by the reflector 14 is blocked by the shade 10; the remaining part of the light is projected forward by the projection lens 8, thereby illuminating the road ahead.

Moreover, during the operation, the light source 12, which is mounted on the upper end face of the pillar portion 18, generates heat; the generated heat is then directly transferred to the pillar portion 18. On the other hand, the high-heat-generating elements 32 of the lighting control circuit 31, which are mounted on the substrate 28 and received in the recess 26 of the pillar portion 18, also generate heat; the generated heat is then transferred to the pillar portion 18 via the filling material filled in the recess 26.

As indicated with arrows in FIG. 10, the heat transferred to the pillar portion 18 from the light source 12 and the high-heat-generating elements 32 is further transferred to the heat dissipating fins 20. In addition, it should be noted that only a small part of the heat generated by the high-heat-generating elements 32 is dissipated to the internal space of the lamp chamber 6 via the cap 38 that covers the opening 30 of the recess 26.

The heat transferred from the pillar portion 18 to the heat dissipating fins 20 is then dissipated by the fins 20. Consequently, the air around the heat dissipating fins 20 is warmed up and thereby expanded. The air then flows toward the upper wall 1*c* of the housing 1 through the spaces between the heat dissipating fins 20. Thereafter, as indicated with arrows in FIG. 1, the air flows forward along the upper wall 1*c* of the housing 1 to the lens cover 4 which closes the front opening 2 of the housing 1. In addition, at this stage, the air is prevented by the reflector 14 and the shade 10 from flowing downward.

Further, the air flows downward along the inner surface of the lens cover 4, and then flows backward to the heat dissipating fins 20 through the space between the shade 10 and the lower wall 1*a* of the housing 1.

As a result, the air warmed up by the heat dissipated by the heat dissipating fins 20 is cooled by heat exchange with outside air via the rear wall 1*b*, upper wall 1*c*, lower wall 1*a* and side walls of the housing 1 as well as via the lens cover 4.

After reaching the heat dissipating fins 20, the cooled air turns to flow upward through the spaces between the heat dissipating fins 20. Consequently, the air is again warmed up and expanded by the heat dissipated by the heat dissipating fins 20. Thus, there is formed a circulation path along which air inside the housing 1 flows; during its flow along the circulation path, the air is warmed up by the heat dissipated by the heat dissipating fins 20 and cooled by the heat exchange with outside air via the walls of the housing 1 and the lens cover 4. As a result, with the air flow along the circulation path, both the heat generated by the heat source 12 and the heat generated by the high-heat-generating elements 32 can be continuously removed to the outside of the housing 1.

Furthermore, in the present embodiment, the lighting control circuit 31 includes the temperature sensing element 36 that is mounted on the substrate 28 to sense the ambient temperature of the light source 12 and the lighting control circuit 31. When the ambient temperature sensed by the temperature sensing element 36 is higher than or equal to a predetermined temperature, the lighting control circuit 31 controls the amount of electric power supplied to the light source 12 so as to suppress the heat generated by the light source 12 and the lighting control circuit 31.

Consequently, even when the temperature outside the housing 1 is high, it is still possible to prevent the ambient temperature of the lighting source 12 and the lighting control circuit 31 from exceeding the predetermined temperature, thereby ensuring durability of the light source 12 and the lighting control circuit 31.

In addition, during running of the vehicle, the outside air comes to hit against the outer surface of the lens cover 4, thereby enhancing the heat exchange between the outside air and the air in the lamp chamber 6. Moreover, when the outside temperature is so low that snow or ice comes to deposit on the outer surface of the lens cover 4, it is possible to melt the snow or ice with the heat transferred from the air in the lamp chamber 6, thereby reliably illuminating the road ahead.

According to the present embodiment, it is possible to achieve the following advantages.

In the present embodiment, the heat dissipating member 16 is arranged in the lamp chamber 6 and configured to include the pillar portion 18 and the heat dissipating fins 20. The pillar portion 18 has the light source 12 mounted thereto, more specifically mounted on the upper end face thereof. The heat dissipating fins 20 are formed on the radially outer periphery of the pillar portion 18 so as to be spaced from one another. The lighting control circuit 31, which controls the lighting of the light source 12, is formed on the substrate 28. The pillar portion 18 also has the recess 26 formed therein. The substrate 28 is received in the recess 26.

With the above configuration, both the heat generated by the light source 12 and the heat generated by the lighting control circuit 31 will be first transferred to the pillar portion 18 and then dissipated via the heat dissipating fins 20. That is to say, it is possible to effectively dissipate both the heat generated by the light source 12 and the heat generated by the lighting control circuit 31 via the single heat dissipating member 16. Consequently, it becomes possible to minimize both the parts count and size of the headlamp while ensuring effective dissipation of both the heat generated by the light source 12 and the heat generated by the lighting control circuit 31. In addition, since both the light source 12 and the lighting control circuit 31 are arranged within the lamp chamber 6, the wiring process of the headlamp can be simplified.

Moreover, in the present embodiment, the recess 26 is formed to extend along the longitudinal direction (or the axial direction) of the pillar portion 18. The substrate 28 is received in the recess 26 so that the longitudinal direction of the substrate 28 coincides with that of the recess 26.

With the above configuration, it is possible to form the recess 26 in the pillar portion 18 and arrange the substrate 28 in the recess 26 without increasing the size of the pillar portion 18.

In the present embodiment, the lighting control circuit 31 includes the high-heat-generating elements 32 and the low-heat-generating elements 34 that generate less heat than the high-heat-generating elements 32. Further, when the substrate 28 is received in the recess 26, the high-heat-generating elements 32 are positioned closer to the longitudinal axis 180 of the pillar portion 18 than the low-heat-generating elements 34 are.

With the above configuration, it is possible to enhance the heat transfer from the high-heat-generating elements 32 to the pillar portion 18, thereby effectively dissipating the heat generated by the high-heat-generating elements 32.

Further, the distances from the high-heat-generating elements 32 to the interior surface of the pillar portion 18 which defines the recess 26 are set to be less than a predetermined value (e.g., 1 mm in the present embodiment).

Setting the distances as above, it is possible to ensure effective heat transfer from the high-heat-generating elements 32 to the pillar portion 18.

In the present embodiment, as illustrated in FIGS. 8A-8E, the recess 26 is so formed that the shape of the recess 26 conforms to that of the substrate 26 on which the lighting control circuit 31 is formed.

With the above configuration, it is possible to minimize the distances between the elements 32 and 34 of the lighting control circuit 31 and the interior surface of the pillar portion 18 which defines the recess 26.

In the present embodiment, the pillar portion 18 has the injection hole 37 formed therein.

Consequently, with the injection hole 37, it is possible to easily fill the filling material into the recess 26. Further, with the filling material filled in the recess 26, it is possible to more effectively transfer the heat generated by the high-heat-generating elements 32 to the interior surface of the pillar portion 18 which defines the recess 26.

In the present embodiment, the substrate 28 has the temperature sensing element 36 mounted thereon.

Consequently, it is possible to easily connect the temperature sensing element 36 to the lighting control circuit 31 which is also provided on the substrate 28. Moreover, the lighting control circuit 31 can suitably control the amount of electric power supplied to the light source 12 based on the temperature sensed by the temperature sensing element 36.

Next, other embodiments of the present invention will be described with reference to FIGS. 11-15. It should be noted that for the sake of clarity and understanding, identical components having identical functions in different embodiments of the invention have been marked, where possible, with the same reference numerals in each of the figures and that for the sake of avoiding redundancy, descriptions of the identical components will not be repeated.

Figure 11:
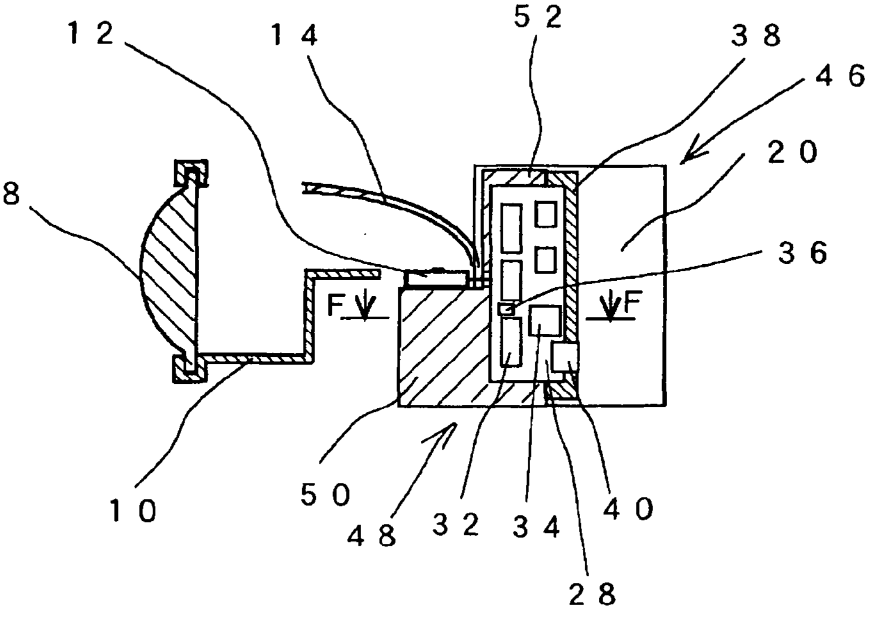
FIG. 11 is a vertical cross-sectional view showing the configuration of a heat dissipating member according to a second embodiment of the invention.
Figure 12:
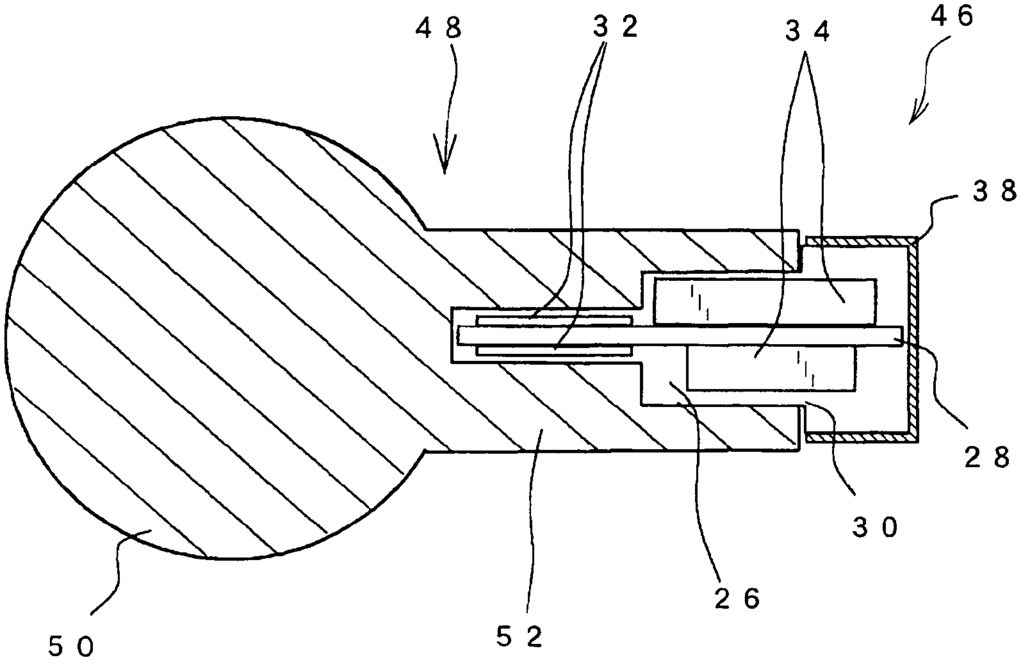
FIG. 12 is an enlarged cross-sectional view taken along the line F-F in FIG. 11.

FIGS. 11 and 12 together show the configuration of a heat dissipating member 46 according to the second embodiment of the invention. As shown in the figures, the heat dissipating member 46 has a pillar portion 48 that is comprised of a cylindrical part 50 and a square-prismatic part 52.

The cylindrical part 50 is lower than the square-prismatic part 52. The light source 12 is mounted on the upper end face of the cylindrical part 50.

The square-prismatic part 52 is integrally formed with and positioned backward of the cylindrical part 50. The height (or the length in the vertical direction) of the square-prismatic part 52 is substantially twice that of the cylindrical part 50. The square-prismatic part 52 has a recess 26 formed in the side surface thereof. The recess 26 has an opening 30 that opens on the side surface of the square-prismatic part 52 and faces backward. The substrate 28 is received in the recess 26 so that the longitudinal direction of the substrate 28 coincides with that of the recess 26.

With the above heat dissipating member 46, it is possible to more easily make up a projector-type headlamp for a vehicle.

Figure 13A:
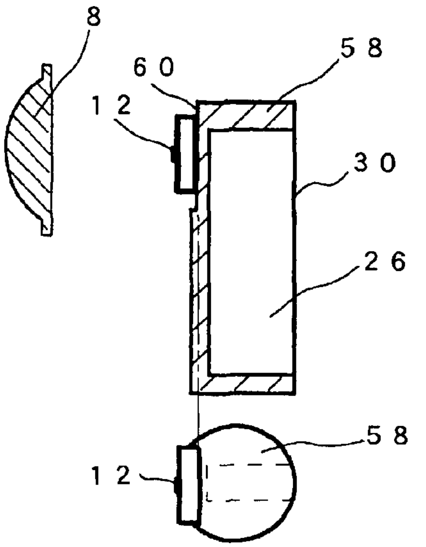
FIGS. 13A-13D are schematic views respectively showing the configurations of pillar portions according third to sixth embodiments of the invention.

FIG. 13A shows the configuration of a pillar portion 58 according to the third embodiment of the invention. As shown in the figure, the side surface of the pillar portion 58 includes a flat area 60 on the front and upper side. The light source 12 is mounted on the flat area 60 so as to face forward.

With the above configuration, it is possible to easily make up a direct projection-type headlamp for a vehicle.

Figure 13B:
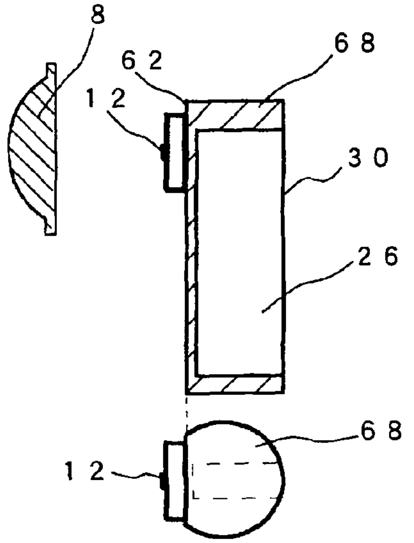

FIG. 13B shows the configuration of a pillar portion 68 according to the fourth embodiment of the invention. As shown in the figure, the side surface of the pillar portion 68 includes a flat area 62 on the front side; the flat area 62 extends over the entire length of the pillar portion 68 in the vertical direction. The light source 12 is mounted on an upper part of the flat area 62 so as to face forward.

Figure 13C:
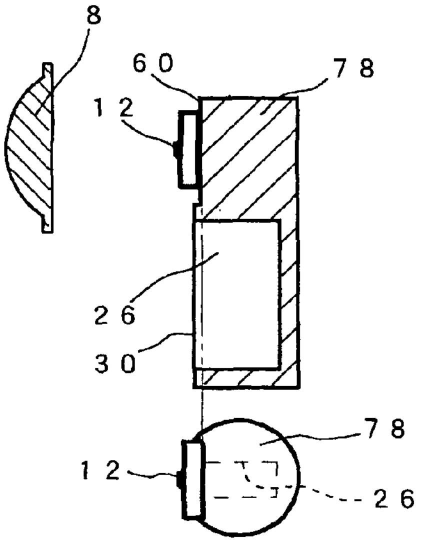

FIG. 13C shows the configuration of a pillar portion 78 according to the fifth embodiment of the invention. As shown in the figure, the recess 26 is formed in a front part of the side surface of the pillar portion 78 so that the opening 30 of the recess 26 faces forward.

With the above configuration, it is possible to provide the heat dissipating fins 20 on the entire rear part of the side surface of the pillar portion 78, thereby increasing the total number of the heat dissipating fins 20 provided on the side surface.

Figure 13D:
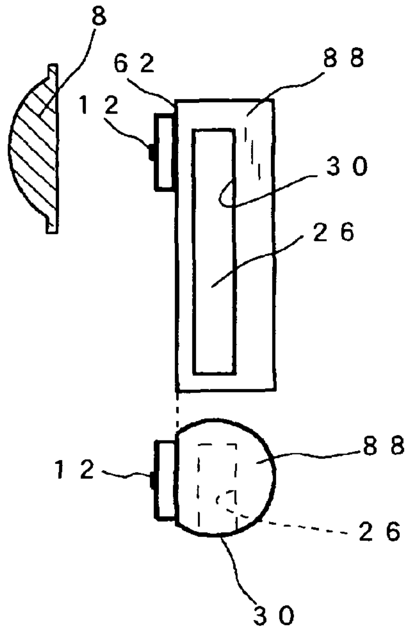

FIG. 13D shows the configuration of a pillar portion 88 according to the sixth embodiment of the invention. As shown in the figure, the recess 26 is formed in a left part of the side surface of the pillar portion 88 so that the opening 30 of the recess 26 faces leftward.

With the above configuration, it is possible to symmetrically arrange the pillar portion 88 and another pillar portion 88, which has the recess 26 formed in a right part of the side surface thereof, close to each other with the openings 30 thereof facing each other.

Figure 14:
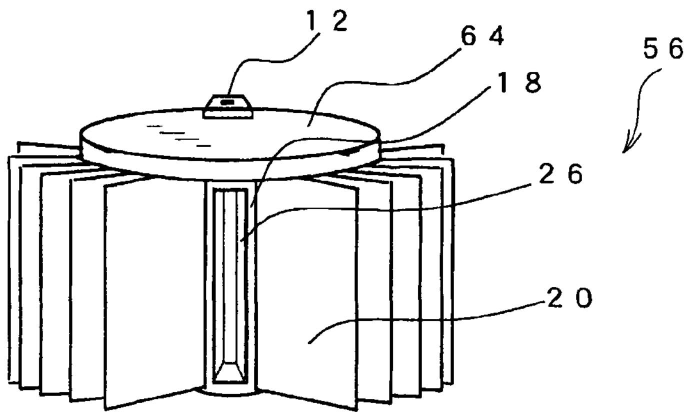
FIG. 14 is a perspective view of a heat dissipating member according to a seventh embodiment of the invention.
Figure 15A:
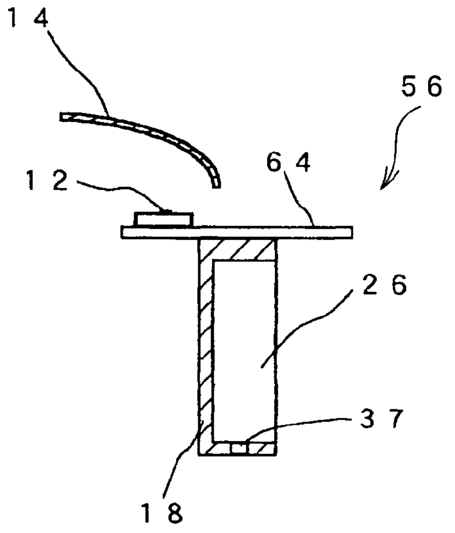
FIG. 15A is a vertical cross-sectional view of the heat dissipating member according to the seventh embodiment.

FIGS. 14 and 15A shows the configuration of a heat dissipating member 56 according to the seventh embodiment of the invention. As shown in the figures, the heat dissipating member 56 has a heat dissipating plate 14 mounted on the upper end face of the pillar portion 18. The heat dissipating plate 14 has, for example, a circular shape. The light source 12 is mounted on a front part of the upper end face of the heat dissipating plate 14.

Figure 15B:
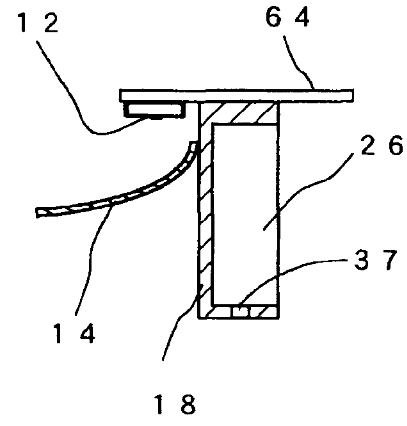
FIG. 15B is a vertical cross-sectional view illustrating a modification of the heat dissipating member according to the seventh embodiment.

With the above heat dissipating member 56, it is possible to easily make up a reflector-type headlamp for a vehicle. In addition, as shown in FIG. 15B, the light source 12 may also be mounted on a front part of the lower end face of the heat dissipating plate 14.

While the above particular embodiments have been shown and described, it will be understood by those skilled in the art that various modifications, changes, and improvements may be made without departing from the spirit of the invention.

What is claimed is:

1. A headlamp for a vehicle, the headlamp comprising:

a housing having a front opening;

a lens cover arranged to cover the front opening of the housing;

a lamp chamber defined by the housing and the lens cover;

a light source provided in the lamp chamber;

a lighting control circuit configured to control lighting of the light source; and a heat dissipating member arranged in the lamp chamber to dissipate heat generated by the light source, wherein the lighting control circuit is formed on a substrate;

the heat dissipating member has a pillar portion and a plurality of heat dissipating fins, the pillar portion has the light source mounted thereto;

the heat dissipating fins are provided on an outer periphery of the pillar portion so as to be spaced from one another, the pillar portion also has a recess formed therein, and the substrate is received in the recess of the pillar portion.

2. The headlamp as set forth in claim 1, wherein the recess is formed to extend along a longitudinal direction of the pillar portion, and the substrate is received in the recess with a longitudinal direction of the substrate coinciding with the longitudinal direction of the pillar portion.

3. The headlamp as set forth in claim 1, wherein the lighting control circuit includes a plurality of high-heat-generating elements and a plurality of low-heat-generating elements that generate less heat than the high-heat-generating elements, and the distances from the high-heat-generating elements to an interior surface of the pillar portion which defines the recess are less than a predetermined value.

4. The headlamp as set forth in claim 1, wherein the lighting control circuit includes a plurality of high-heat-generating elements and a plurality of low-heat-generating elements that generate less heat than the high-heat-generating elements, and the high-heat-generating elements are located closer to a longitudinal axis of the pillar portion than the low-heat-generating elements are.

5. The headlamp as set forth in claim 1, wherein the recess of the pillar portion is so formed that the shape of the recess conforms to that of the substrate on which the lighting control circuit is formed.

6. The headlamp as set forth in claim 1, wherein the light source is mounted on an upper end face of the pillar portion of the heat dissipating member.

7. The headlamp as set forth in claim 1, wherein the heat dissipating member further has a heat dissipating plate mounted on an upper end face of the pillar portion, and the light source is mounted to the heat dissipating plate.

8. The headlamp as set forth in claim 1, wherein the light source is mounted on a front part of a side surface of the pillar portion.

9. The headlamp as set forth in claim 1, wherein the recess is formed in a side surface of the pillar portion to have an opening that opens on the side surface, and the heat dissipating fins are arranged on the side surface of the pillar portion except for the opening of the recess so as to each extend radially from the side surface.

10. The headlamp as set forth in claim 1, wherein the pillar portion further has an injection hole formed therein, and a filling material is injected in the recess through the injection hole.

11. The headlamp as set forth in claim 1, wherein the substrate has a temperature sensing element mounted thereon.

* * * * *